United States Patent [19]
Sasaki

[11] Patent Number: 5,175,671
[45] Date of Patent: Dec. 29, 1992

[54] EXPANDING APPARATUS FOR PORTABLE ELECTRONIC APPARATUS

[75] Inventor: Katumaru Sasaki, Tokyo, Japan

[73] Assignee: Kabushiki Kaisha Toshiba, Kawasaki, Japan

[21] Appl. No.: 672,571

[22] Filed: Mar. 20, 1991

[30] Foreign Application Priority Data

Mar. 20, 1990 [JP] Japan .................................. 2-68239

[51] Int. Cl.$^5$ .............................................. H05K 7/00
[52] U.S. Cl. ................................. 361/392; 361/393; 361/399; 361/415; 439/165; 364/708
[58] Field of Search .............. 361/392, 393, 394, 399, 361/396, 380, 415; 439/31, 165; 364/708, 900; D14/100, 101, 102, 103, 104, 105, 106, 107, 113, 115; D18/1, 7, 11, 12

[56] References Cited

U.S. PATENT DOCUMENTS

| | | | |
|---|---|---|---|
| D. 276,342 | 11/1984 | Kitai | D14/111 |
| 4,002,892 | 1/1977 | Zielinski | 235/156 |
| 4,530,066 | 7/1985 | Ohwaki et al. | 364/708 |
| 4,571,456 | 2/1986 | Paulsen et al. | 179/2 C |
| 4,654,818 | 3/1987 | Wetterau, Jr. | 364/900 |
| 4,680,674 | 7/1987 | Moore | 361/395 |
| 4,769,764 | 9/1988 | Levanon | 364/708 |
| 4,788,658 | 11/1988 | Hanebuth | 364/900 |
| 4,858,162 | 8/1989 | Kieffer et al. | 364/708 |
| 4,903,221 | 2/1990 | Krenz | 364/708 |
| 5,058,045 | 10/1991 | Ma | 364/708 |

FOREIGN PATENT DOCUMENTS

| | | |
|---|---|---|
| 49-25332 | 3/1974 | Japan . |
| 51-77033 | 6/1976 | Japan . |
| 53-29057 | 7/1978 | Japan . |
| 54-96546 | 7/1979 | Japan . |
| 55-10236 | 7/1980 | Japan . |
| 57-17041 | 1/1982 | Japan . |
| 58-44647 | 3/1983 | Japan . |
| 0170831 | 11/1985 | Japan . |
| 62-30096 | 8/1987 | Japan . |
| 1520573 | 8/1978 | United Kingdom . |

OTHER PUBLICATIONS

Extention Device for a Personal Computer, IBM Technical Disclosure Bulletin, May 1985, pp. 6887-6890.

Primary Examiner—Leo P. Picard
Assistant Examiner—Young S. Whang
Attorney, Agent, or Firm—Oblon, Spivak, McClelland, Maier & Neustadt

[57] ABSTRACT

An expanding apparatus includes an apparatus body containing expansion boards for expanding the functions of an electronic apparatus. The container or apparatus body has a supporter on which the rear portion of the electronic apparatus is mounted. The supporter has a fitting groove to which a stand of the electronic apparatus mounted on the supporter is fitted, so that the apparatus is positioned with respect to the container. A slide connector is attached to the container to be movable to a connecting position where the connector is connected to a connector of the positioned electronic apparatus.

18 Claims, 5 Drawing Sheets

EXPANDING APPARATUS FOR PORTABLE ELECTRONIC APPARATUS

BACKGROUND OF THE INVENTION

1. Field of the Invention

The present invention relates to an expansion apparatus adapted to be connected to a portable electronic apparatus, such as a laptop personal computer, word processor, etc., to expand the functions of the device.

2. Description of the Related Art

Nowadays, portable electronic apparatus, such as laptop personal computers and book-type personal computers, are widely used due to some advantages including easy transportation, effective use of space, etc.

These conventional electronic apparatuses, however, have only the minimum functions for essential operations. If other functions are required in addition to those basic ones, therefore, the electronic apparatuses conventionally are connected with expansion apparatuses having the additional functions, e.g., a printer, external floppy disk drive unit, etc., by means of connecting cables or the like.

Examples of the expansion apparatuses of this type are disclosed in U.S. Pat. Nos. 4,788,658 and 4,769,764. These apparatuses are of a container type such that a portable electronic apparatus is housed therein while it is operated. Disclosed in Published Examined Japanese Utility Model Application No. 53-29057, moreover, is a connection-type expansion apparatus which is adapted to be connected to the back of a portable electronic apparatus.

The container-type expanding apparatus has a holding recess in which the portable electronic apparatus is to be contained. The electronic apparatus is connected electrically and mechanically to the expansion apparatus in a manner such that the front end of the former is flush with the front edge of the latter. According to this arrangement, moreover, the electrical and mechanical connections between the two systems can be easily achieved by only mounting the electronic apparatus in the holding recess.

However, the electronic apparatus is fixed mechanically to the expansion apparatus with respect to the longitudinal direction only by connecting the respective connectors of the units. If the electronic apparatus is subjected to any external force, therefore, it is very likely to be disengaged from the expansion apparatus. If the electronic apparatus is unexpectedly disconnected from the expansion apparatus during operation, these systems suffer action errors, which result in destruction of in-process data or troubles of the systems themselves. The removal of the mechanical and electrical connections between the electronic apparatus and the expansion apparatus may possibly be prevented by strengthening the connection between their connectors. If this is done, however, it requires troublesome work to disengage the electronic apparatus from the expansion apparatus after use. Since the expansion apparatus of this type is arranged so that the whole electronic apparatus is contained in the holding recess, moreover, it is relatively large-sized and requires a wide installation space.

On the other hand, the connection-type expansion expanding apparatus comprises guide pins to be inserted into guide holes of an electronic apparatus and a screwing mechanism for connecting the apparatus to the electronic apparatus. In connecting this expansion apparatus to the electronic apparatus, the former is first positioned with respect to the rear side of the latter so that the guide pins are aligned with the guide holes. In this state, the expansion apparatus is moved toward the electronic apparatus in a manner such that the guide pins are inserted into the guide holes, and the two units are connected mechanically to each other by means of screws. After the mechanical connection is finished, the connector of the expansion apparatus is connected to that of the electronic apparatus, so that the two systems are connected electrically to each other.

Since the expansion apparatus of this type is connected mechanically to the electronic apparatus by means of the screws, the mechanical connection can hardly be removed by accident during operation. In comparison with the container-type apparatus, however, the connection-type apparatus has a more complicated structure for connection. In making the mechanical connection, moreover, the guide pins must be aligned with the guide holes of the electronic apparatus, thus requiring complicated work. Further, the use of the screws makes the connection and disconnection more troublesome.

SUMMARY OF THE INVENTION

The present invention has been contrived in consideration of these circumstances, and its object is to provide an expansion apparatus of a simple construction which can be easily mechanically connected to or disconnected from a portable electronic apparatus, and is designed so that the connection cannot be removed even when subjected to an external force.

In order to achieve the above object, an expansion apparatus according to the present invention comprises: a container containing at least one expansion device of the portable electronic apparatus, a supporter releasably fixing the stand and positioning the portable electronic apparatus with respect to the container, and a slide connector connected to the container or apparatus body and slidable between an first position for electrically connecting the portable electronic apparatus and the expansion device and a second position for releasing the connection.

According to the apparatus constructed in this manner, by only setting the rear portion of the portable electronic apparatus on the supporting portion, the stand of the electronic apparatus can be engaged with the supporter so that the electronic apparatus is located in a predetermined position with respect to the apparatus body and is allowed to move neither in the longitudinal direction nor in the transverse direction. If the slide connector, in this state, is moved to the first position and connected to the expansion connector of the electronic apparatus, the electronic apparatus and the expansion device are connected electrically to each other, and the electronic apparatus and the expansion apparatus are connected mechanically to each other. The electronic apparatus can be removed from the expansion device by only moving the slide connector to the second position where it is separated from the expansion connector and then lifting the electronic apparatus off the supporter.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 1 to 5 show an example of a laptop personal computer adapted to be connected with an extension apparatus according to the present invention, in which FIGS. 6 to 10 show the expansion apparatus according to an embodiment of the present invention, in which

DETAILED DESCRIPTION OF THE PREFERRED EMBODIMENT

An embodiment of the present invention will now be described in detail with reference to the accompanying drawings.

First, a laptop personal computer adapted to be connected with an expansion apparatus according to the present invention will be described.

Figure 1:
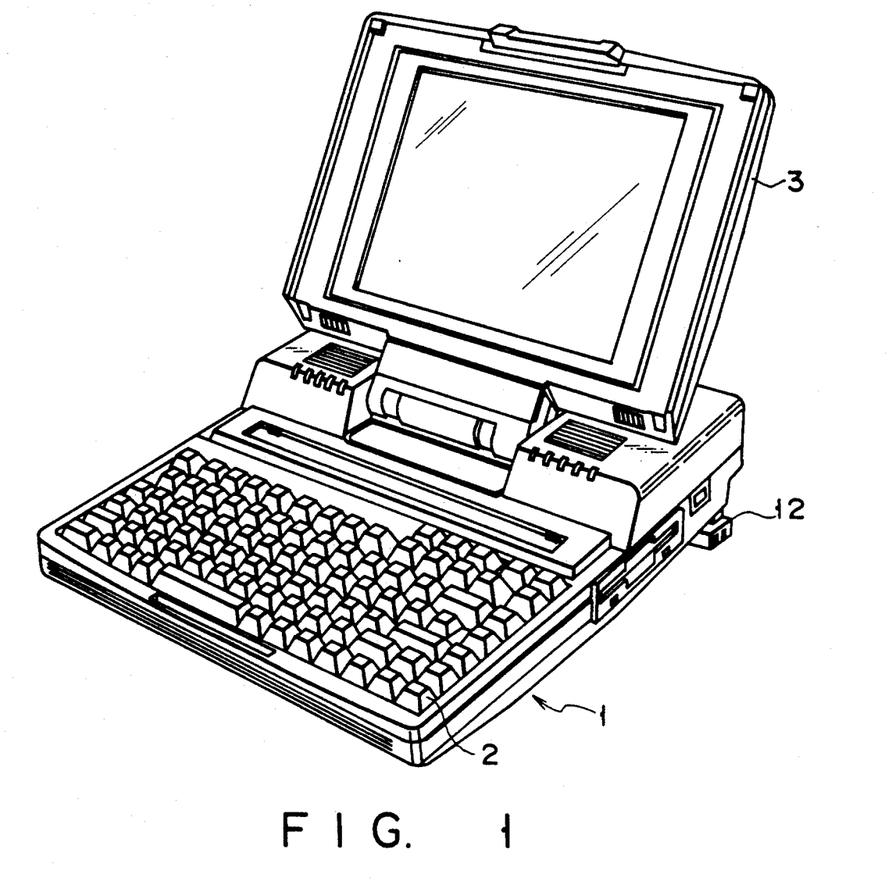
FIG. 1 is a perspective view showing an outline of the computer.
Figure 2:
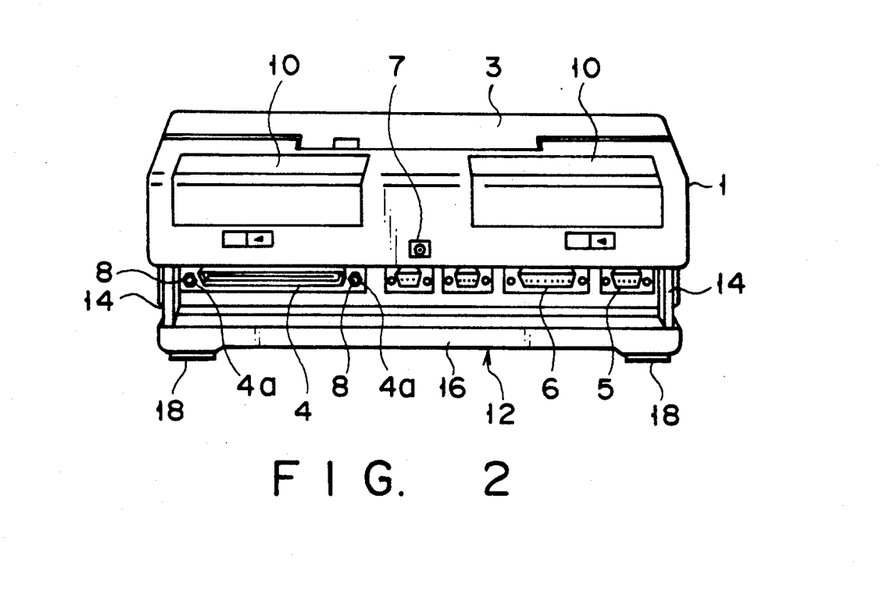
FIG. 2 is a rear perspective view of the computer.

As shown in FIGS. 1 and 2, the personal computer has a base unit 1 in the form of a flat rectangular box. A keyboard 2 is mounted on the top of the front portion of the base unit 1. A display unit 3 in the form of a flat panel is provided at the back of the keyboard 2. The unit 3 is pivotally supported on the base unit 1 so as to be rockable between a closed position, where it covers the keyboard 2 from above, and an open position, where it stands upright behind the keyboard 2. When the display unit 3 is rocked to the closed position, its rear face becomes continuous and flush with the top face of the base unit 1, as shown in FIG. 2.

The rear face of the base unit 1 is mounted with an expansion connector 4, RGB connector 5, printer connector 6, other connectors, and power socket 7. These connectors and the socket 7 are connected electrically to a driver circuit (not shown) in the base unit 1. The connector 4 is fixed to the base unit 1 by means of a pair of nuts 4a on the opposite sides thereof, and the tapped hole of each nut constitutes a guide hole 8, which will be mentioned later.

A pair of battery packs 10 are removably attached to the upper portion of the back of the base unit 1. Thus, the computer can be operated for a predetermined period of time with use of these battery packs 10 even when it is cut off from the power supply through the power socket 7.

Figure 3:
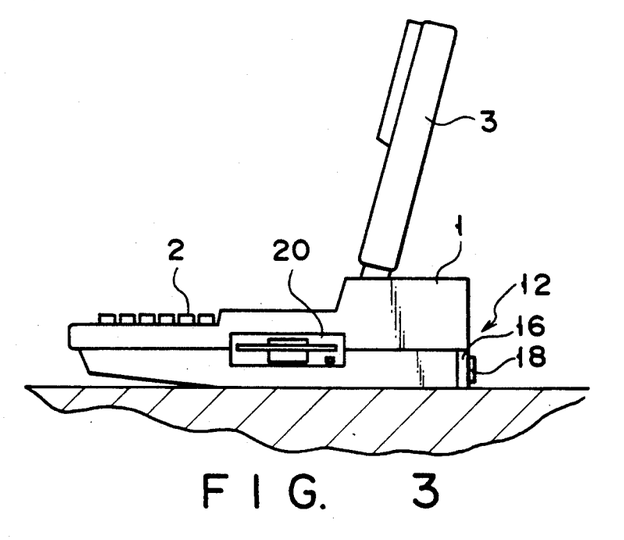
FIG. 3 is a side view schematically showing the computer with its stand in a retracted position.
Figure 4:
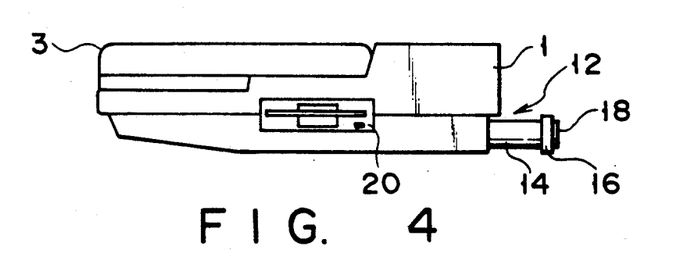
FIG. 4 is a side view schematically showing the computer with the stand in a transportation position.
Figure 5:
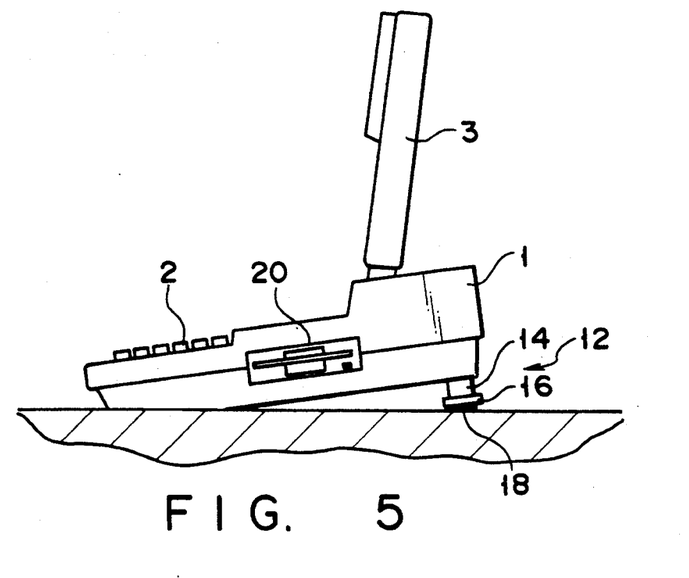
FIG. 5 is a side view schematically showing the computer with the stand in a tilting position.

A stand 12, which doubles as a carrying handle, is provided on the rear portion of the base unit 1. The stand 12 includes a pair of parallel legs 14 and a connecting portion 16 which connects the respective end portions of the legs. Each leg 14 is attached to each corresponding end portion of the back of the base unit 1 so as to be rockable and slidable in its longitudinal direction. Thus, the stand 12 is shiftable between a retracted position shown in FIG. 3, a transportation position shown in FIG. 4, and a tilting position shown in FIG. 5. In the retracted position, the legs 14 are pushed entirely into the base unit 1, the connecting portion 16 is situated flush with the rear face of the base unit 1 so as to cover the connectors 4, 5 and 6. When the stand 12 is to be used as a handle, it is drawn out rearward from the retracted position to the transportation position at the back of the base unit 1. Also, the stand 12 can be set in the tilting position by pushing the respective proximal end portions of the legs 14 into the base unit 1, after rocking the stand downward through about 90° from the transportation position. In the tilting position, the legs 14 extend downward from the bottom of the base unit 1 substantially at right angles thereto, while the connecting portion 16 faces the bottom of the base unit. In this state, the stand 12 is locked, that is, prevented from rocking. As shown in FIG. 5, the keyboard 2 can be set in a forwardly tilted position by placing the computer on a desk with the stand 12 in the tilting position.

Rectangular rubber projections 18 are attached individually to the opposite end portions of the bottom of the connecting portion 16. These projections 18 serve as nonskid means for the stand 12. In FIGS. 1, 3, 4 and 5, numeral 20 denotes a floppy disk drive in the base unit 1.

Figure 6:
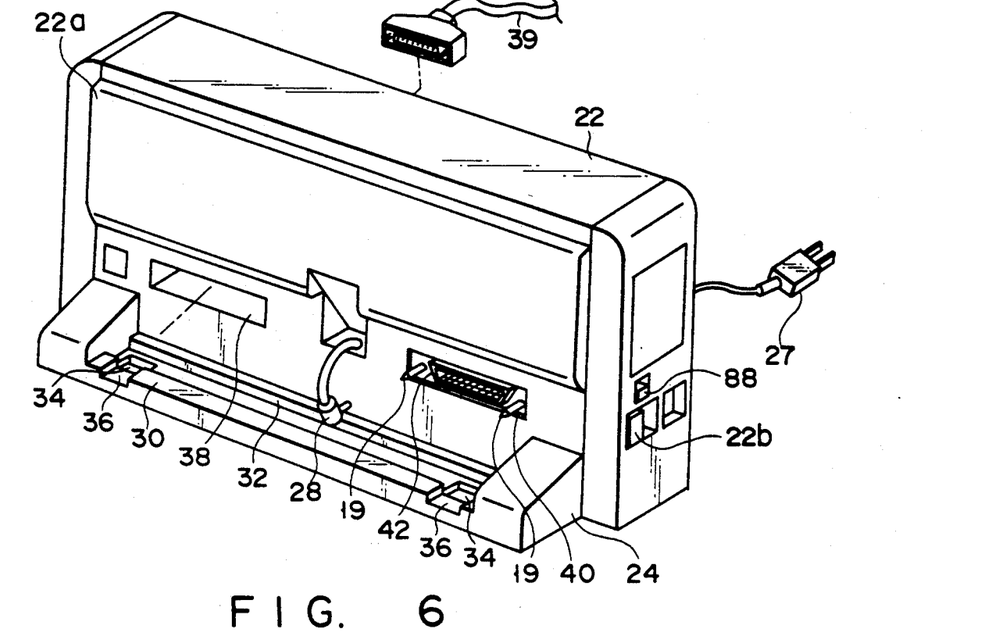
FIG. 6 is a perspective view showing an outline of the apparatus.
Figure 7:
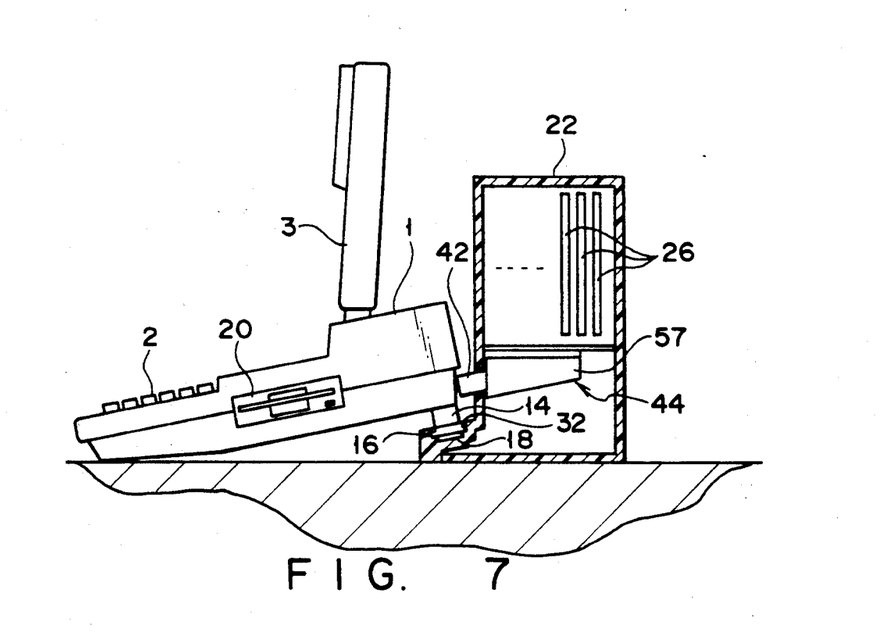
FIG. 7 is a sectional view schematically showing the apparatus connected to the personal computer.

The expansion apparatus to be connected to the computer constructed in this manner comprises a container or apparatus 22 body in the form of a rectangular prism, as shown in FIGS. 6 and 7. A supporter 24 for supporting the rear portion of the computer protrudes forward from the lower portion of a front wall 22a of the apparatus 22. The apparatus 22 contains a plurality of expansion boards 26, such as expansion memory boards, communication boards, etc., which serve to expand the functions of the computer. In addition to the expansion boards, the apparatus body 22 may also contain other expansion parts such as a floppy disk drive, hard disk drive, printer, etc. Further, the apparatus body 22 contains an AC/DC converter (not shown) for converting commercial AC power supplied through a power plug 27 into DC power, whereby the DC power is supplied to the computer in a DC drive mode. The converter is connected with a DC cable 28 which, having a connecting plug at an end thereof, extends outward through the front wall 22a of the apparatus body 22. The DC power can be supplied to the computer by connecting the connecting plug 28 to the power socket 7 of the computer which is connected to the expanding apparatus.

The supporter 24 has a forwardly declined upper face 30, which is formed having a fitting groove 32 for positioning the computer, on the supporter 24 with respect to the apparatus body 22. The groove 32, extends parallel to the front wall 22a, has a width and a length substantially equal to those of the connecting portion 16 of the stand 12 of the computer. The connecting portion 16 can be fitted in the groove 32. Recesses 34 for receiving the projections 18 of the stand 12 are formed individually at the opposite end portions of the bottom surface of the groove 32. A pair of guide grooves 36 are formed on the upper face 30 of the supporter 24 so as to extend perpendicular to the fitting groove 32. One end of each guide groove 36 opens to the front edge of the supporter 24, while the other end communicates with the fitting groove 32 in the vicinity of its corresponding recess 34.

In connecting the computer to the expansion apparatus, the rear portion of the computer, having the stand 12 in the tilting position, is placed on the supporter 24 so that the connecting portion 16 is fitted in the fitting groove 32, as shown in FIG. 7. At this time, the stand 12 is introduced into the fitting groove 32 while the projections 18 are guided by their corresponding guide grooves 36. Thereupon, the projections 18 are fitted into their corresponding recesses 34. Thus fitted in the fitting groove 32, the stand 12 is restrained from moving longitudinally and crosswise by the groove 32. In this manner, the computer, is set in a desired position with respect to the apparatus body 22.

As shown in FIG. 6, a rectangular aperture 38 and a rectangular opening 40 are formed in the front wall 22a of the apparatus body 22. The aperture 38, which is situated opposite to the connectors 5 and 6 of the computer on the supporter 24, penetrates the apparatus body 22 and opens to the rear face thereof. Passed through the aperture 38 is a cable 39 for connecting some other external apparatus, such as a display (CRT), printer, etc., than the expansion apparatus to the connector 5 or 6 of the computer. The opening 40 is situated opposite to the expansion connector 4 of the computer on the supporter 24. Arranged in the apparatus body 22 is a slide connector 42 which can be connected to the expansion connector 4 through the opening 40. The connector 42 is supported so as to be slidable between a first position, where it projects forward through the opening 40, and a second position, where it is housed in the apparatus body 22, by means of a slide mechanism, which will be mentioned later. Further, the connector 42 is connected electrically to the expansion boards 26 in the apparatus body 22 by means of cables 43 (see FIG. 8).

Figure 8:
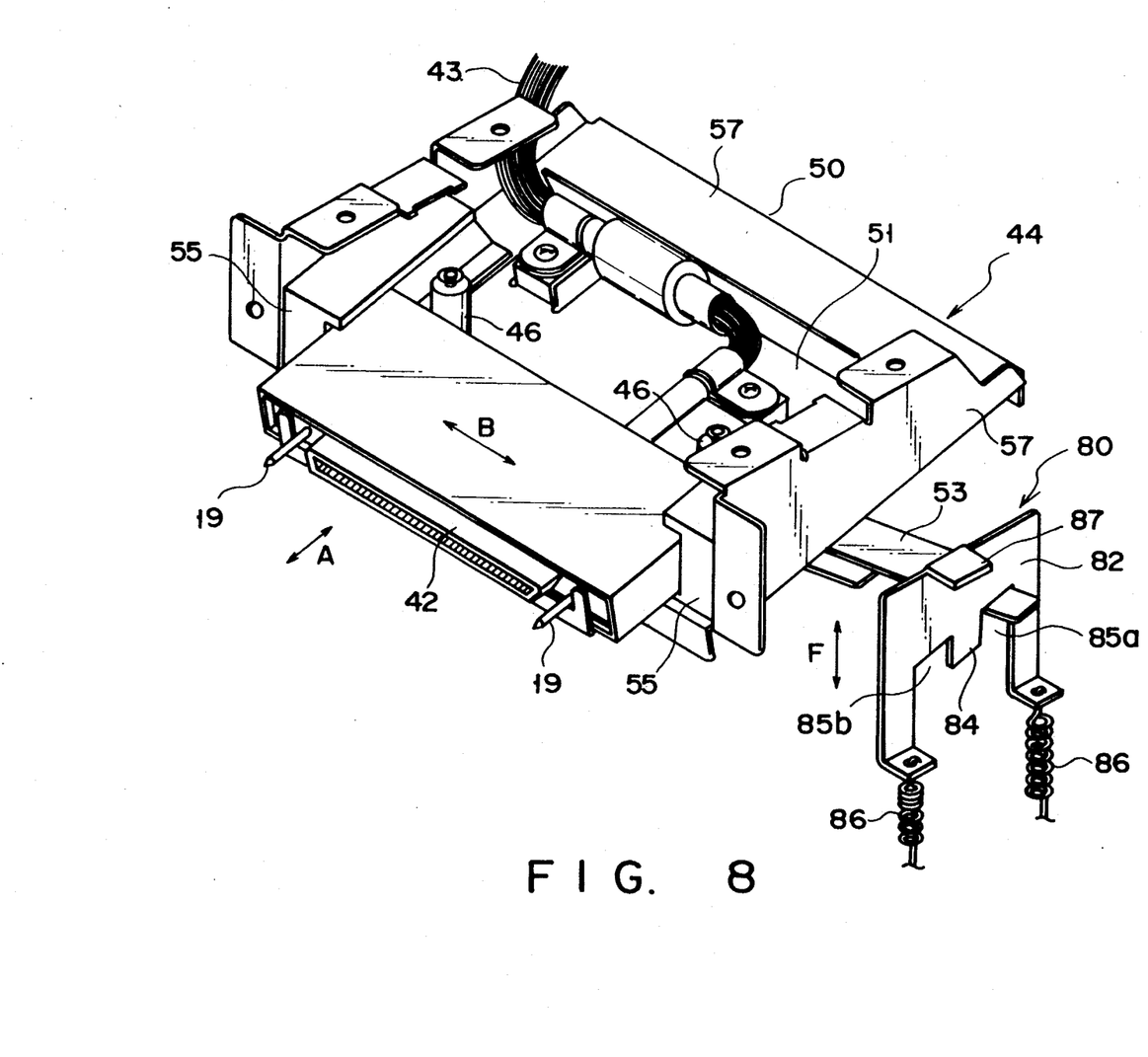
FIG. 8 is a perspective view showing a slide connector and an operating mechanism.

As shown in FIGS. 7 and 8, the slide mechanism 44 is provided with a support frame 57 fixed to the inner surface of the front wall 22a of the apparatus body 22. A slide plate 51 is mounted on the frame 57 so as to be slidable in the direction of arrow A. The sliding direction A is set at a predetermined angle to a horizontal plane to match the tilt of the computer connected to the expansion apparatus. The connector 42 is mounted on the slide plate 51 so as to be integrally movable therewith in the direction of arrow A and slightly movable in the direction of arrow B, which is perpendicular to the direction of arrow A, with respect to the plate 51. Both end portions of the connector 42 are guided individually by means of a pair of guides 55 fixed to the support frame 57. Mounted on the slide plate 51, moreover, are a pair of guide rollers 46 which guide the movement of the connector 42 in the direction of arrow B. The rollers 46 are in contact with the rear face of the connector 42. A guide pin 19 protrudes in the direction of arrow A from each side of the connector 42. The pins 19 are formed and arranged so that they can be inserted into the respective guide holes 8 of their corresponding nuts 4a for fixing the expansion connector 4 of the computer.

Figure 9:
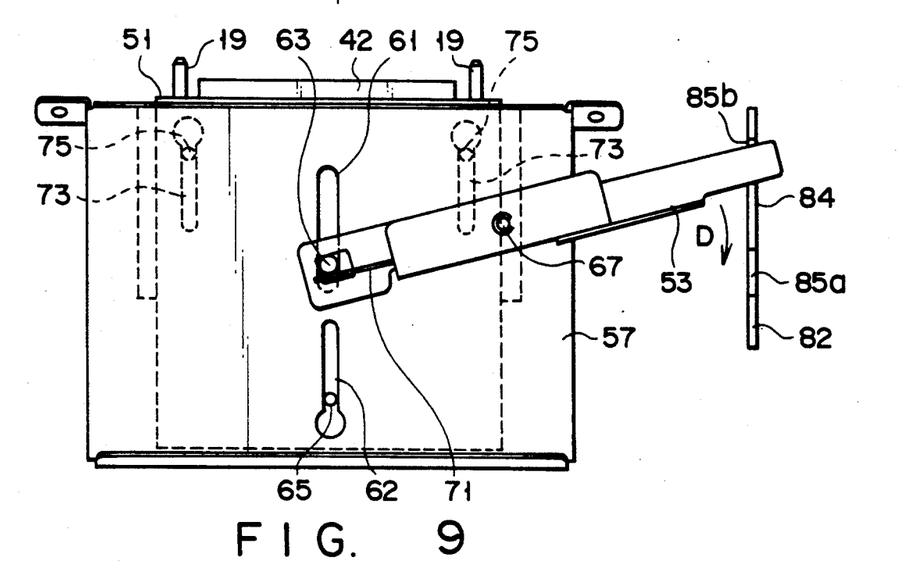
FIG. 9 is a bottom view of the operating mechanism with the connector in a first position.
Figure 10:
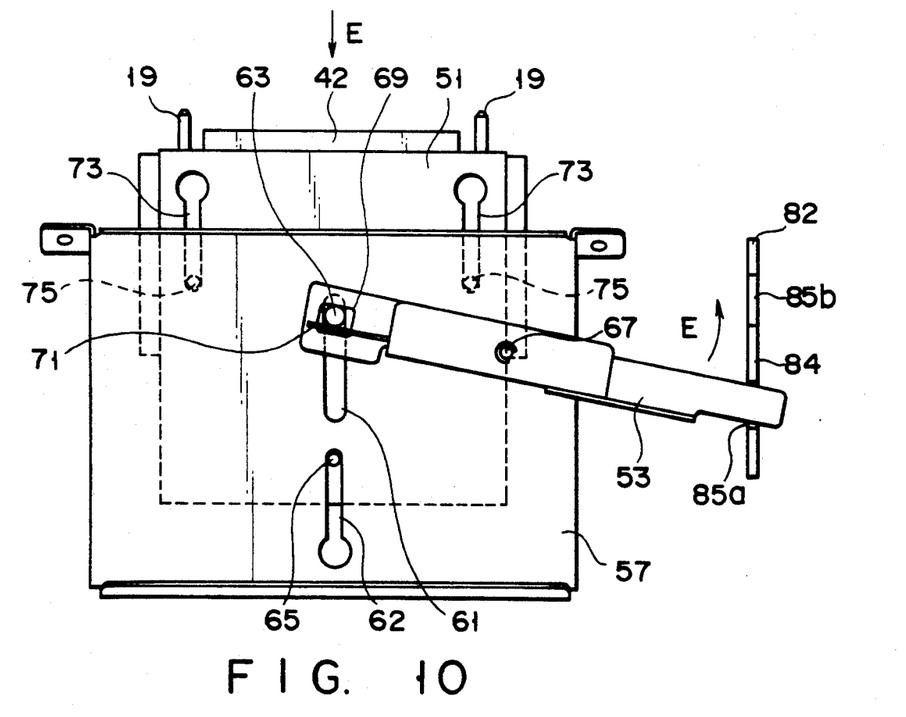
FIG. 10 is a bottom view of the operating mechanism with the connector in a second position.

As shown in FIGS. 9 and 10, first and second guide slits 61 and 62 are bored through the bottom wall of the support frame 57 so as to extend in alignment with each other in the direction of arrow A of FIG. 8. A moving pin 63, which is fixed to the slide plate 51, is slidably fitted in the first slit 61. A second guide pin 65, which is also fixed to the slide plate 51, is slidably fitted in the second slit 62, whereby the movement of the plate 51. The slide plate 51 has a pair of third guide slits 73 which extend parallel to each other in the direction of arrow A. A pair of first guide pins 75, which protrude from the upper surface of the bottom wall of the support frame 57, are slidably fitted in the slits 73, individually. Thus, the slide of the slide plate 51 is guided by means of the first and second guide pins 75 and 65.

A pivot 67 protrudes from the bottom surface of the support frame 57. The intermediate portion of a rocking lever 53 is rotatably supported by the pivot 67. A rectangular hole 69 is formed at one end portion of the lever 53, and the moving pin 63 is inserted in the hole 69. Also, a leaf spring 71 for pressing the pin 63 in the direction of arrow C of FIG. 9 is attached to the one end portion of the lever 53. The other end of the arm 53 extends close to a side wall 22b of the container 22, and is connected to a first operating knob 47 (see FIG. 6), which is slidably attached to the side wall 22b of the container 22. Thus, the lever 53 can be rotated by means of the knob 47 from outside the apparatus body 22.

FIG. 9 shows the connector 42 in its second position. If the rocking lever 53 is rotated in the direction of arrow D of FIG. 9, in this state, the slide plate 51 is moved in the direction of arrow C by means of the moving pin 63, so that the connector 42 is moved to its first position shown in FIG. 10. If the lever 53 is rotated in the direction of arrow E of FIG. 10, on the other hand, the connector 42 is moved from the first position to the second position.

A locking mechanism 80 for locking the rocking lever 53 is provided in the apparatus body 22. As shown in FIG. 8, the mechanism 80 includes a substantially U-shaped locking plate 82, which is movable in the direction of arrow F substantially perpendicular to the extending direction of the lever 53. The plate 82 is located across the distal end portion of the lever 53. The locking plate 82 includes a retaining projection 84 projecting toward the lever 53, and first and second retaining recesses 85a and 85b situated on either side of the projection 84. The plate 82 is urged toward a locking position, that is, toward the lever 53, by means of a pair of compression springs 86 interposed between the plate 82 and the apparatus body 22.

Thus, when the slide connector 42 is in the second position, as shown in FIG. 9, the distal end portion of the lever 53 is fitted in the second retaining recess 85b of the locking plate 82, so that the lever 53 is restrained from rotating by the plate 82. In this manner, the connector 42 is locked to the second position. When the connector 42 is in the first position, as shown in FIGS. 8 and 10, the distal end portion of the lever 53 is fitted in the first retaining recess 85a of the locking plate 82, so that the lever 53 is restrained from rotating by the plate 82. Thus, the connector 42 is locked to the first position.

The locking plate 82 has a projection 87 which projects toward the side wall 22b of the apparatus body 22. The protection 87 is connected to a second operating knob 88 (see FIG. 6), which is vertically slidably attached to the side wall 22b. Thus, the locking plate 82 can be moved upward or toward an unlocking position by means of the knob 88 from outside the container 22. In the unlocking position, the retaining projection 84 of the locking plate 82 is disengaged from the rocking arm 53, so that the lever 53 or the connector 42 is allowed to rock or move.

The following is a description of a process for mounting the computer on the expansion apparatus.

First, an operator connects the DC connector 28 to the power socket 7 of the computer, keeping the stand 12 in the tilting position. Some of those function expansion parts which are contained in the expansion apparatus require such great power consumption that the the capacity of each battery pack 10 of the computer will be exhausted in a short time. When the computer is used with the expansion apparatus, therefore, it is advisable to supply power to the computer through the AD/DC converter. Accordingly, the computer is provided with a control circuit (not shown) which is arranged so that the computer cannot be activated unless the cable 28 is connected to the socket 7, although the expansion connector 4 is connected electrically to the slide connector 42.

After connecting the cable 28 to the socket 7 the operator puts the stand 12 on the front end portion of the supporter 24 so that the projections 18 of the stand 12 engage their corresponding guide grooves 36 of the supporter 24. If the operator pushes the computer toward the apparatus body 22 in this state, the stand 12 is guided by the grooves 36 and fitted into the fitting groove 32. At the same time, the projections 18 of the stand 12 are fitted into their corresponding recesses 34. As the stand 12 is thus fitted into the groove 32, the computer is set in a predetermined position with respect to the expansion apparatus so that it is allowed to move neither in the longitudinal direction nor in the transverse direction.

In this state, the operator operates the second operating knob 8 to release the rocking lever 53 from locking by means of the locking mechanism 80, and then operates the first operating knob 47 to move the slide connector 42 to the first position. Thereupon, the connector 42 is connected to the expansion connector 54 of the computer. At this time, the guide pins 19 are inserted into their corresponding guide holes 8 on the computer side, whereby the connector 42 is aligned with the connector 4. If the second operating knob 88 is released after the connector 42 is moved to the first position, the rocking lever 53 is restrained from rotating by the locking mechanism 80, so that the connector 42 is locked to the first position. As the connectors 42 and 4 are connected to each other, the computer and the expansion apparatus are connected electrically to each other, so that transmission and reception of data are allowed between them. The connection between the connectors 42 and 4 also ensures mechanical connection between the computer and the expanding apparatus.

The computer can be removed from the expansion apparatus by reversely following the aforementioned procedure of operation.

According to the expansion apparatus constructed in this manner, the computer can be positioned with respect to the apparatus, so as to be immovable in the longitudinal and transverse directions, by only fitting the stand 12 of the computer into the fitting groove 32 of the supporter 24. Thus, the computer can be easily, securely connected to and disconnected from the expansion apparatus. Further, the apparatus can be made simple and small-sized by only providing the supporter of the container with the fitting groove for the stand. Since the apparatus is furnished with the locking mechanism 80 for locking the slide connector to the predetermined position, moreover, the connector can be prevented from being unexpectedly disconnected, so that the connection between the apparatus and the computer can be maintained more securely.

It is to be understood that the present invention is not limited to the embodiment described above, and that various changes and modifications may be effected therein by one skilled in the art without departing from the scope or spirit of the invention.

For example, the expansion apparatus according to the present invention may be also applied to a compact electronic apparatus whose stand is composed of a pair of legs without having a connecting portion, resulting in the same effect of the aforementioned embodiment. The expansion apparatus of the invention is not limited to the use with laptop personal computers, and is also adapted for use with any other portable electronic apparatus, such as word processors, which have a stand.

What is claimed is:

1. An expansion apparatus for a portable electronic apparatus which comprises a base unit including a rear portion having a rear surface, an expansion connector fixed on the rear surface, and a stand attached to the rear portion, for tilting the base unit, the expansion apparatus comprising:

an apparatus body containing an expansion device for the portable electronic apparatus;

a supporter provided at the apparatus body and including positioning means for releasably engaging the stand and positioning the electronic apparatus with respect to the apparatus body; and a slide connector electrically connected to the expansion device and attached to the apparatus body to be slidable between a first position, in which the slide connector is connected to the expansion connector of the electronic apparatus positioned by the positioning means and a second position in which the slide connector is separated from the expansion connector.

2. An expansion apparatus according to claim 1, wherein the apparatus body further comprises a front surface and the supporter is fixed to the front surface.

3. An expansion apparatus according to claim 2, wherein the slide connector projects from the front surface in the first position and is stored in the apparatus body in the second position.

4. An expansion apparatus according to claim 2, wherein the apparatus body further comprises a rear surface and an opening for leading a cable, for electrically connecting the portable electronic apparatus and other expansion apparatus, from the front surface to the rear surface of the apparatus body.

5. An expansion apparatus according to claim 1, wherein the positioning means includes a fitting groove formed on the supporter.

6. An expansion apparatus according to claim 5, wherein the positioning means further comprises a guide groove formed on the supporter for guiding the stand before the stand is set in the fitting groove.

7. An expansion apparatus according to claim 1, wherein the apparatus body further comprises a side surface having a lever for sliding the slide connector between the first position and the second position, the lever is movable between a third position for setting the slide connector in the first position and a fourth position for setting the slide connector in the second position.

8. An expansion apparatus according to claim 7, wherein the apparatus body comprises a stopper for selectively locking the lever in the third position and fourth position.

9. An expansion apparatus according to claim 8, wherein the stopper further comprises a release lever for releasing the lock of the stopper.

10. An expansion apparatus for a portable computer which comprises a base unit including a leg for tilting the portable computer and a rear surface having an expansion connector, the expansion apparatus comprising:
   an apparatus body containing an expansion device for the portable computer and including a front surface;
   a supporter fixed to the front surface and having positioning means for releasably engaging the leg to position the portable computer with respect to the expansion apparatus when the leg is supported on the supporter; and
   a slide connector provided at the apparatus body and slidable between a first position projecting from the front surface for electrically connecting the expansion device and the portable computer positioned by the positioning means and a second position for releasing the connection.

11. An expansion apparatus according to claim 10, wherein the positioning means comprises a fitting groove for positioning the leg and a guide groove for guiding the leg before the leg is set on the fitting groove.

12. An expansion apparatus according to claim 10, further comprising a lever for sliding the slide connector and a stopper for releasably locking the lever, the lever being slidable between a third position for setting the slide connector in the first position and a fourth position for setting the slide connector in the second position and locked in the third and fourth positions by the stopper.

13. An expansion apparatus according to claim 10, wherein the apparatus body further comprises an opening for leading a cable for electrically connecting the portable computer and other expansion apparatus.

14. An expansion apparatus for a portable computer comprising a base unit having a leg for tilting the portable computer and a rear surface having an expansion connector, the expansion apparatus comprising:
   an apparatus body containing an expansion device for the portable computer;
   a supporter releasably engaging the leg and positioning the portable computer with respect to the expansion apparatus;
   a slide connector releasably connecting the expansion connector to the expansion device positioned by the supporter;
   sliding means for sliding the slide connector between a first position for electrically connecting the expansion connector and the expansion device and a second position for releasing the connection; and
   a stopper for selectively locking the slide connector in the first position and the second position.

15. An expansion apparatus according to claim 14, wherein the supporter comprises fixing means for positioning the leg and guide means for guiding the leg before the leg is positioned by the fixing means.

16. An expansion apparatus according to claim 14, wherein the apparatus body comprises leading means for leading a cable, for electrically connecting the portable computer to other expansion apparatus.

17. An expansion apparatus according to claim 14, further comprising storing means for storing the connector in the apparatus body in the second position.

18. An expansion apparatus according to claim 14, wherein the apparatus body comprises means for storing a plurality of expansion boards for expanding functions of the portable computer.

* * * * *